United States Patent
Suh

[11] Patent Number: 6,118,947
[45] Date of Patent: Sep. 12, 2000

[54] DRIVE METHOD AND DEVICE FOR AN ELECTRONIC SHUTTER AND AUTO FOCUS CONTROL MECHANISM USED IN CAMERAS

[75] Inventor: Jae-gyeong Suh, Kyungsangnam-do, Rep. of Korea

[73] Assignee: Samsung Aerospace Industries, Ltd., Kyungsangnam-do, Rep. of Korea

[21] Appl. No.: 09/132,671

[22] Filed: Aug. 12, 1998

[30] Foreign Application Priority Data

Aug. 12, 1997 [KR] Rep. of Korea .................. 97-38300

[51] Int. Cl.⁷ .................................................. G03B 13/36
[52] U.S. Cl. .................................................. 396/90; 396/89
[58] Field of Search ................................ 396/72, 79, 80, 396/81, 82, 83, 90, 125, 133, 104, 89; 359/696, 697, 698

[56] References Cited

U.S. PATENT DOCUMENTS

| | | | |
|---|---|---|---|
| 4,634,254 | 1/1987 | Ogihara et al. | 354/403 |
| 4,885,600 | 12/1989 | Iwasa et al. | 354/400 |
| 4,918,480 | 4/1990 | Hori | 354/400 |
| 4,924,253 | 5/1990 | Imai et al. | 396/81 |
| 5,111,230 | 5/1992 | Kobayashi | 354/400 |
| 5,422,699 | 6/1995 | Sato et al. | 396/82 |
| 5,832,319 | 11/1998 | Seo | 396/90 |

FOREIGN PATENT DOCUMENTS 61-9632  1/1986  Japan .

Primary Examiner—W. B. Perkey
Attorney, Agent, or Firm—Howrey & Simon

[57] ABSTRACT

A method for driving a shutter of a camera includes the steps of determining whether a first shutter release is performed, measuring light and distance to the subject if the first shutter release is performed, determining both a focus position of the focus control lens to the subject and a light exposure according to the measured light and distance, reading focus compensating data stored in a memory, calculating a compensated focus position on the basis of the focus compensating data, determining whether a second shutter release is performed, moving the focus control lens to the compensated focus position, and driving the shutter. The focus compensating data are obtained by a method including the steps of: setting a focus control lens to an initial position, moving a lens barrel to a first zoom position to a subject, measuring actual focus lens position, calculating a focus compensating distance by measuring the difference between the position of a designed focus lens and actual focus lens position, and storing data on the calculated compensating distance in a recording medium.

2 Claims, 18 Drawing Sheets

Counterclockwise

ST1 : H
ST3 : L

Clockwise

ST1 : L
ST3 : H

ST1 : H
ST3 : H

ST1 : H
ST3 : H

Counter Clockwise ⟵⟶ Clockwise

Counterclockwise ← → Clockwise

DRIVE METHOD AND DEVICE FOR AN ELECTRONIC SHUTTER AND AUTO FOCUS CONTROL MECHANISM USED IN CAMERAS

BACKGROUND OF THE INVENTION (a) Field of the Invention

The present invention relates to an electronic shutter of a camera, and more particularly, to a driving method and device for an electronic shutter used in cameras which (a) reduce the focus control time by minimizing the focus control lens movement necessary for focusing according to the distance to a subject; (b) maintain an optimal exposure by reducing temperature variations of the camera during the sector opening; and (c) provide a reliable focus control throughout the entire focal distances by electronically compensating for assembly defects.

(b) Description of the Related Art

Cameras using an electronic shutter typically have a system that conducts automatic focus control by adjusting focus control lenses to correspond to distances between the camera and the subject and performs automatic exposure by controlling the opening size of a diaphragm according to the light levels.

Conventional cameras utilizing such electronic shutters are disclosed in U.S. Pat. Nos. 4,918,480, 4,634,254 and 5,111,230; and Japanese Patent No. Showa 61-9632.

With reference to FIGS. 12, 13a–c and 14, U.S. Pat. No. 4,918,480 discloses an invention wherein a clockwise rotation of a step motor 216 moves a second rotating member 223 against a first rotating member 222, which is a focus control ring and directly contacts the second rotating member 223. At the same time, the stopper 239 moves along the gear portion 236 of the second rotating member 223 one tooth at a time until the first rotating member 222 reaches the focused zoom location calculated by the electronic controller (not shown).

When the first rotating member 222 reaches the focused zoom location, the step motor 216 rotates counterclockwise and the second rotating member 223 moves in the opposite direction to open a sector to a degree of exposure calculated by the camera's electronic controller. At this point, the second rotating member 223 is held at the zoom location by the stopper 239. Further, after opening the sector corresponding to the determined degree of exposure, the step motor 216 then again rotates clockwise to close the sector.

Even after the sector has been completely closed, the second rotating member 223 continues to rotate to come in contact with the first rotating member 222. Accordingly, the first rotating member 222 completes its rotation to the determined zoom location, and the stopper 239 moves to the end of the gear portion 236 of the second rotating member 223, where the stopper 239 becomes disengaged from the gear portion 236. When the stopper 239 is disengaged from the gear portion 236, the step motor 216 rotates in the counterclockwise direction, returning the entire system to an initial state.

With reference to FIG. 15, U.S. Pat. No. 5,111,230, discloses an invention wherein a clockwise rotation of a step motor has a main drive ring 304 rotate counterclockwise to move a lens drive ring 305 (304b pushes against 305c). As a result, a latch lever 308 passes over latch gears 305e one tooth at a time.

When the lens drive ring 305 reaches a zoom location determined by a camera's electronic controller (not shown), the step motor then rotates counterclockwise. At this time, although the lens drive ring 305 is forced to rotate counterclockwise by a spring 306, the latch lever 308 engaged with the latch gears 305e prevents the lens drive ring 305 from moving and maintains its position where zooming is completed.

When zooming is completed as calculated by the electronic controller and the step motor starts to rotate counterclockwise, a trapezoid cam 304d of the main drive ring 304 is located to the left of a protruding trigger arm 316b. Here, even if the trapezoid cam 304d contacts the protruding trigger arm 316b by the counterclockwise rotation of the main drive ring 304, the protruding trigger arm 316b merely rotates clockwise and a sector open/close lever 310 remains locked.

The counterclockwise rotation of the step motor rotates the main drive ring 304 clockwise and the trapezoid cam 304d of the main drive ring 304 contacts the protruding trigger arm 316b. Here, the rotational force of the main drive ring 304 passes through the trigger arm 316b and is transmitted to a pin 313b of a hold lever 313. Accordingly, the hold lever 313 rotates counterclockwise.

The counterclockwise rotation of the hold lever 313 releases the sector open/close lever 310 and the lever 310 rotates clockwise by the elastic force of a spring 315, thereby opening a sector. As soon as the sector opens, the step motor stops rotation and keeps the sector open for a period corresponding to a degree of exposure calculated by the camera's electronic controller.

Then, the step motor continues to rotate counterclockwise such that a first projection 304c of the main drive ring 304 pushes against a lower portion of the open/close lever 310, thereby closing the sector. Further, the second projection 304b of the main drive ring 304 pushes upward on an extension 308b of the latch lever 308 such that the lens drive ring 305 is released to move free. Accordingly, the lens drive ring 305 rotates clockwise by the elastic force of the spring 306 to return to the initial position.

In U.S. Pat. No. 4,634,254, with reference to FIG. 16, a focus control lever 407' remains unlocked by an active magnet while a step motor rotates clockwise from an initial position. From this state, a distance ring 409' moves in unison with a drive plate 401' by the elastic force of a spring 409'f until the distance ring 409' reaches a zoom position calculated by the camera's electronic controller (not shown). When the distance ring 409' reaches the zoom location, the magnet is turned off to lock the focus control lever 407', thereby also keeping the distance ring 409' locked.

The step motor continues to rotate clockwise even after the distance ring 409' is locked and rotates a sector lever 404' along the shape of the drive plate 401' to open a sector for the exposure period calculated by the camera's electronic controller. After opening the sector, the step motor rotates counterclockwise and the sector lever 404' follows the shape of the drive plate 401' by the elastic force of the spring 409'f, thereby closing the sector. A continued counterclockwise rotation of the step motor returns the entire system to the initial state.

The zooming of a focus control lens by the movement of the distance ring 409 in U.S. Pat. No. 4,634,254 will be described hereinafter with reference to FIG. 17.

Through first release and second release operations, the drive plate 401' moves the focus control lens from a minimum zoom location (j) to a maximum zoom location (k). The focus control lens is mechanically locked when it reaches a position corresponding to the subject distance.

Then, the drive plate 401' rotates in an opposite direction to perform an exposure operation for a specific period determined by the camera's light meter. Then, the focus control lens returns to the minimum zoom location (j), which is an initial state.

The minimum zoom location (j) refers to the focus control lens position when focused for the maximum distance to the subject and the maximum zoom location (k) refers to the focus control lens position when focused for the minimum distance to the subject.

In Japanese Patent No. Showa 61-9632, with reference to FIG. 18, a step motor 503 rotates clockwise in an initial state to move a drive plate 501 to the right. Simultaneously, an active electromagnet 507e attracts a steel piece 507c to keep a focus control lever 507 disengaged from teeth 502c.

An extension 502e of a focus control distance ring 502 contacts a projection 501d of the drive plate 501, and the focus control distance ring 502 rotates clockwise to zoom a picture lens. When the focus control distance ring 502 reaches a position determined by the camera's electronic controller (not shown), the electromagnet 507e is deactivated by cutting off the power supply. Accordingly, the focus control lever 507 rotates clockwise by the elastic force of a spring 507a. Thus, a hook 507d of the focus control lever 507 engages with the teeth 502c of the focus control distance ring 502 to prevent it from moving and keep the picture lens focused.

Next, the step motor 503 rotates counterclockwise to move the drive plate 501 to the left. And the counterclockwise rotation of the sector lever 504 by a cam 501f and the elastic force of a spring opens a sector. The sector opens until a level of exposure, determined by the camera's electronic controller, is reached. And the step motor 503 again rotates clockwise to move the drive plate 501 to the right. Accordingly, the sector lever 504 rotates clockwise until the sector is closed, and the drive plate 501 continues to move to the right until it reaches the initial position.

Each of the above conventional electronic shutter systems provides a rotating ring that moves a focus control lens according to the measured distance to a subject and a locking mechanism that locks the rotating ring when the focus control lens has reached the focus position. Further provided are sector open/close means for first opening the sector for an amount of time corresponding to a level of exposure determined by the camera's electronic controller, then closing the sector; a return mechanism for returning an exposure control ring to an initial position, the exposure control ring operating the sector open/close means until an established position is reached by the sector; and a power source, providing power for the operation of the rotating ring, exposure control ring and the locking mechanism.

Accordingly, cameras using such conventional electronic shutters have a complicated structure to drive the focus control lens. Further, while focusing and controlling exposure for different subjects, the rotating ring moves the focus control lens from a minimum distance to a maximum distance and vice versa which increases the zooming time.

In addition, a now very common practice in conventional cameras using such an electronic shutter is to put multiple steps between the minimum and maximum zoom locations to enhance focus control. In such methods, since the focus control ring must rotate from an initial position to a specific position to control the focus, it takes longer to control the focus and the responsiveness of the electronic shutter is reduced.

SUMMARY OF THE INVENTION

The present invention has been made in an effort to solve the above problems.

It is an objective of the present invention to provide a drive method and device for an electronic shutter used in cameras that reduce the movement of a focus control lens to shorten the time for focus control and increase the responsiveness of the electronic shutter.

It is another objective of the present invention to provide a drive method and device for an electronic shutter used in cameras which open a sector by the elastic force of a spring according to the rotation of an exposure control ring to prevent resistance during the sector opening.

It is yet another objective of the present invention to provide a drive method and device for an electronic shutter used in cameras wherein backup data of focus positions is used to achieve reliable focus control for all focal distances by compensating for defects caused during the assembly process.

It is still yet another objective of the present invention to provide a drive method and device for an electronic shutter used in cameras which realize the above objectives, while maintaining a simple structure for the entire system.

To achieve the above objectives, the present invention provides a method for driving a shutter of a camera that includes the steps of: determining whether a first shutter release is performed, measuring light and distance to the subject if the first shutter release is performed, determining both a focus position of the focus control lens to the subject and a light exposure according to the measured light and distance, reading focus compensating data stored in a memory, calculating a compensated focus position based on the focus compensating data, determining whether a second shutter release is performed, moving the focus control lens to the compensated focus position, and driving the shutter.

The focus compensating data are obtained by a method comprising the steps of: setting a focus control lens to an initial position, moving a lens barrel to a first zoom position to a subject, measuring actual focus lens position, calculating a focus compensating distance by measuring the difference between the position of a designed focus lens and actual focus lens position, and storing data on the calculated compensating distance in a recording medium.

According to another aspect of the present invention, a drive device for an electronic shutter used in cameras comprises a first drive unit for establishing an initial position and zooming a focus control lens; a rotating member meshed with the first drive unit by a gear; an initial position detecting and adjusting unit for driving the rotating member to the initial position; an elastic member mounted to a sector lever for providing elastic force to open sectors; and a second drive unit for maintaining said sectors closed unless being rotated in a first rotational direction according to a determined amount of exposure, in which case, together with the elastic force of the elastic member, said second drive unit maintains said sectors open, and which is rotated in a second rotational direction after the determined amount of exposure is completed such that the sectors are closed.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
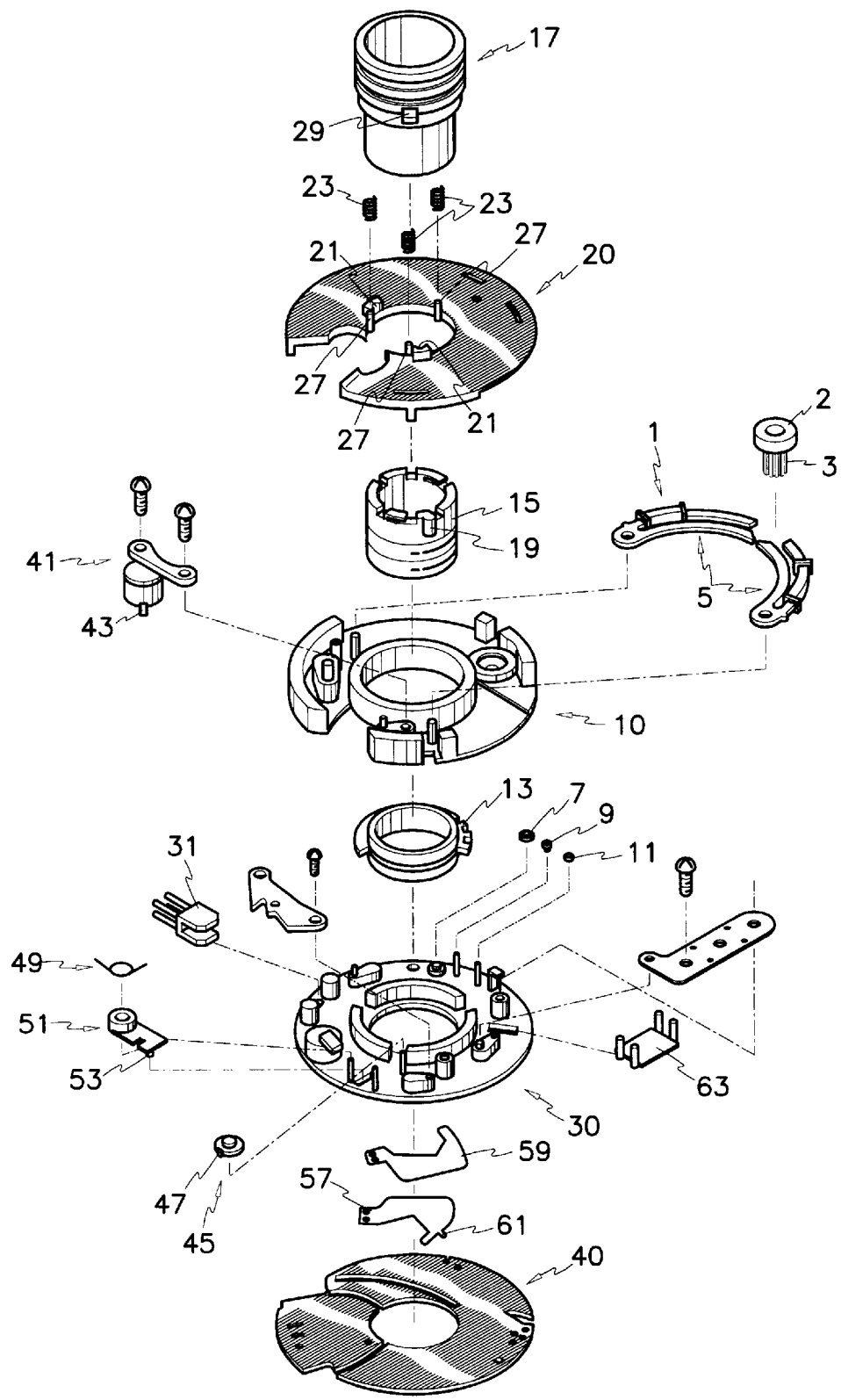
FIG. 1 is a perspective view of an electronic shutter drive device used in cameras according to a preferred embodiment of the present invention.

FIG. 1 shows a detailed perspective view of an electronic shutter drive device used in cameras according to a preferred embodiment of the present invention.

Reference numeral 1 in the drawing refers to a power source, the power source 1 operating as a first drive means to drive a focus control ring 13. The power source 1 comprises a rotor 2 which is a permanent magnet having four poles; a motor gear 3 integrally formed to the rotor 2; and a pair of stators 5 having four connecting points ST1, ST2, ST3 and ST4 (see FIG. 6) to which step pulses are applied to control the rotational direction and drive of the rotor 2.

The power source 1 rotates clockwise or counterclockwise by 90° per one step pulse applied to the four connecting points ST1, ST2, ST3 and ST4, and one step comprises two drive pulses. Further, the power source 1 is positioned on top of a motor base 10 and is covered by a motor cover 20.

Figure 2:
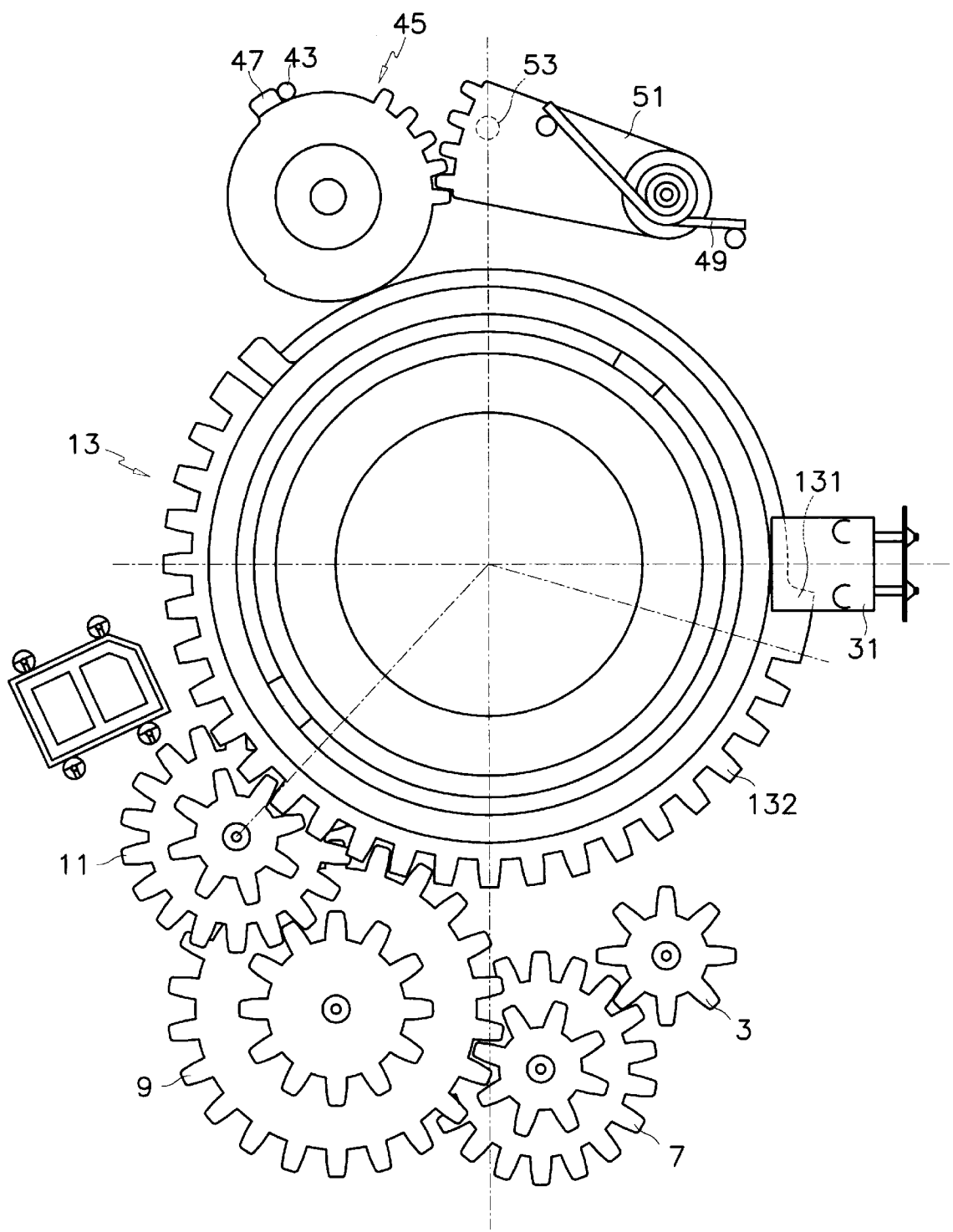
FIG. 2 is a bottom view of first drive means and second drive means shown in FIG. 1.

As shown in FIG. 2, the first drive means also comprises first, second and third double gears 7, 9 and 11 to form a transfer gear set. The first double gear 7 engages with both the motor gear 3 of the power source 1 and the second double gear 9 and the third double gear 11 engages with both the second double gear 9 and the focus control ring 13. The second double gear 9 also engages with the focus control ring 13. The focus control ring 13 moves a focus control lens in unison. The third double gear 11 rotates in a direction opposite to the rotation direction of the motor gear 3 of the power source 1 and the focus control ring 13 rotates in the same direction as the motor gear 3.

The transfer gear is positioned above a shutter base 30 and connected under the motor base 10. Further, the focus control ring 13 joins a lens holder 15 and is rotatably supported between the shutter base 30 and the motor base 10.

Figure 3:
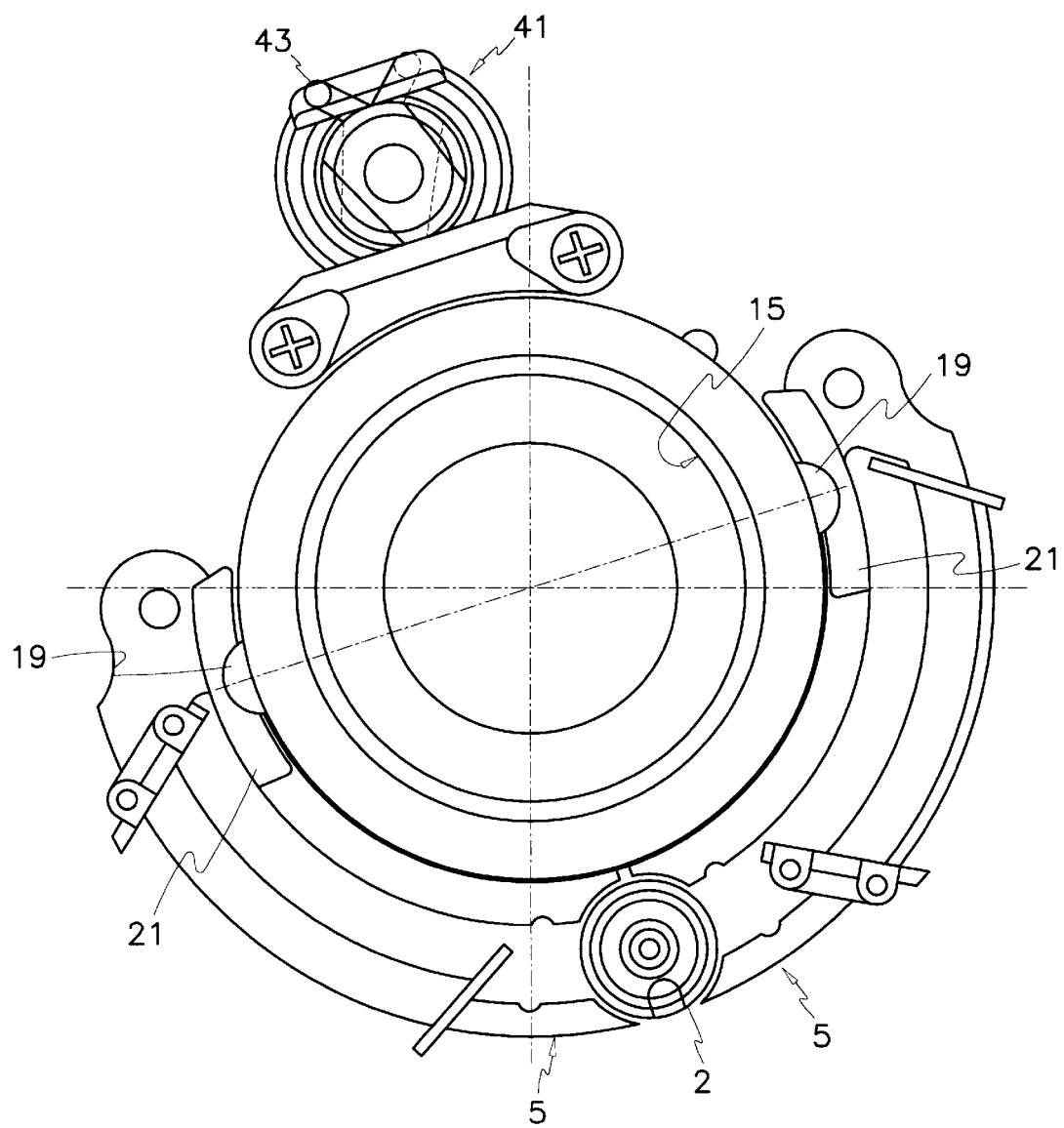
FIG. 3 is a plan view of a focus control lens and a rotating member shown in FIG. 1 in a combined state.

The lens holder 15 is inserted in the motor cover 20. As shown in FIG. 3, protrusions 19 formed on an outer circumference of the lens holder 15 are inserted in grooves 21 formed longitudinally along an inner circumference of the motor cover 20. Accordingly, the lens holder 15 moves up and down along the grooves 21 as the focus control ring 13 rotates in both directions in unison with the power source 1.

The electronic shutter drive device of the present invention also includes an initial position detecting and adjusting unit. The initial position detecting and adjusting unit checks the position of the focus control ring 13 and restores it to the predetermined initial position when the camera's electronic circuit is turned on or when the shutter is ready for operation according to the camera's calculation based on the light and distance measurement.

The initial position detecting and adjusting unit, as shown in FIG. 2, comprises a section extension 131 and a gear portion 132, both of which are formed on an outside circumference of the focus control ring 13, and a photo interrupter 31. The photo interrupter 31 includes a light receptor and a light emitter. Describing more in detail, with reference to FIG. 5, light is detected by the light receptor as the focus control ring 13 rotates, and it can be determined by the light detection whether the section extension 131 of the focus control ring 13 is in an initial position.

Here, if the section extension 131 is determined not to be located in the initial position, the controller outputs a predetermined pulse signal to the power source 1 to rotate the focus control ring 13 either clockwise or counterclockwise to set the focus control ring 13 to the initial position.

The present invention also includes an automatic exposure device for opening and closing a sector. The automatic exposure device, with reference to FIG. 1, comprises an automatic exposure meter 41 that is a second drive unit. The automatic exposure meter 41 includes a boss 43 which rotates clockwise or counterclockwise according to the applied current direction.

As shown in FIGS. 1 and 2, the boss 43 is rotatably supported in the motor base 10 and, is engaged with a stopper 47 of a gear lever 45 to prevent it, by the coercive force of the exposure meter 41, from rotating clockwise by the elastic force of a sector lever 51. The gear lever 45 is engaged with the sector lever 51, the sector lever 51 rotatably connected to the shutter base 30. The sector lever 51 has a pin 53 which, as shown in FIGS. 1 and 4, is connected to sectors 57 and 59.

Further, as shown in FIG. 2, an elastic member 49 is connected to the sector lever 51. Accordingly, if the clockwise direction current is applied, the automatic exposure meter 41 rotates clockwise and the stopper 47 of the gear lever 45 is released, as the sector lever 51 pivots down due to the elastic force of the spring 49. As the sector lever 51 pivots down (counterclockwise), the pin 53 opens sectors 57 and 59. However, if the automatic exposure meter 41 receives current in the opposite direction, the automatic exposure meter 41 overcomes the elastic force to rotate in the counterclockwise direction, thereby closing the sectors 57 and 59.

Figure 4:
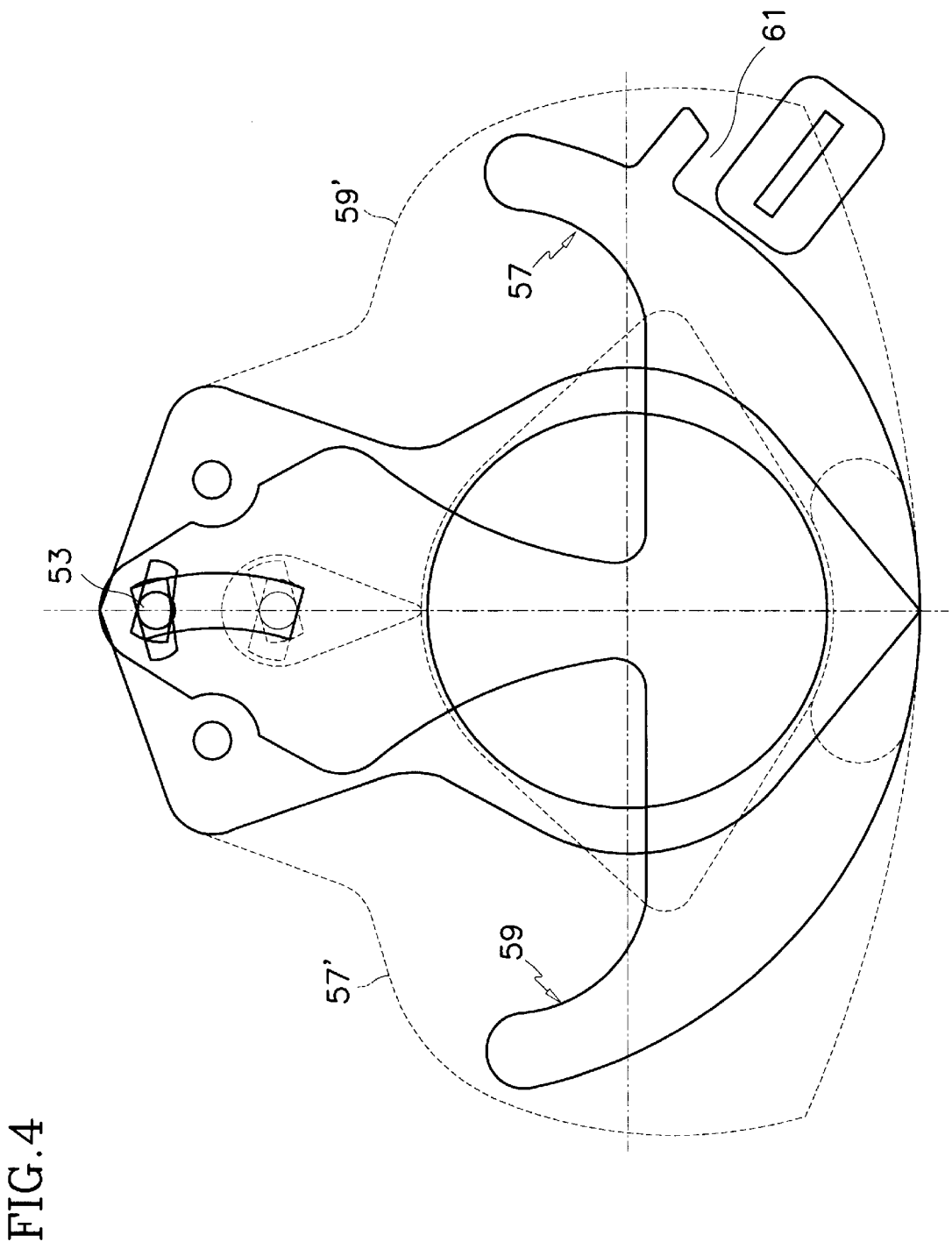
FIG. 4 is a plan view of sectors shown in FIG. 1.

With reference to FIGS. 1 and 4, the sectors 57 and 59 are securely supported on the shutter base 30 and the sector cover 40 is connected under the sectors 57 and 59. Further, a tab 61 is formed on the left sector 57 and the tab 61 is detected by a photo reflector 63 fixed on the shutter base 30 to establish a starting point for automatic exposure control.

In more detail, during the release of the gear lever 45 when current is supplied to the automatic exposure meter 41, the sectors 57 and 59 are open as shown by dotted lines 57' and 59', respectively, by the elastic force of the elastic member 49 of the sector lever 51. Here, the photo reflector 63 detects the opening point of the sector 57 such that the controller precisely keeps the sector 57 open to a degree according to the desired exposure measured by the light meter.

The present invention includes more focus adjusting steps (e.g. ±30 steps) for the focus control ring 13 in addition to the focus control steps determined by the optical system (e.g. 40 steps) to compensate for the errors caused by the lens assembly. When needed, the focus control ring 13 uses these extra steps to fine-tune the focus control lens.

The electronic shutter drive device for cameras of the present invention having the above functions and structure will be described in more detail hereinafter.

Figure 10:
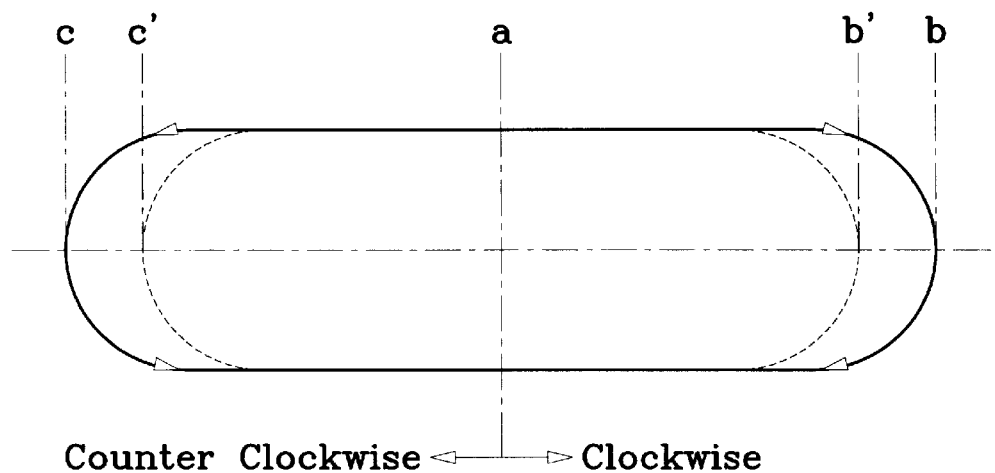
FIG. 10 is a drawing used for describing a drive method for an electronic shutter according to a preferred embodiment of the present invention.

If a camera is turned on, or if a shutter is detected to drive, the controller initializes to position the focus control ring 13 at the center (a), as shown in FIG. 10, through the first drive unit 1.

Figure 6:
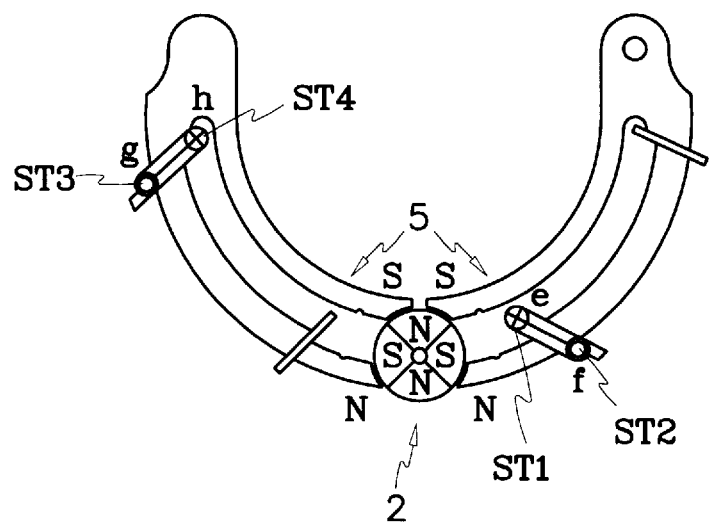
FIG. 6 is a drawing illustrating a power source, for driving the rotating member of the focus control lens, shown in FIG. 1 in an initial state.

Here, if the controller, with reference to FIGS. 1 and 6, outputs high and low control signals to the connecting points ST1, ST2, ST3 and ST4 of the stators 5 to drive the rotor 2, the double gears 7, 9 and 11 (see FIG. 2) rotates the focus control ring 13 in the same direction as the rotor 2 at a lower speed according to the gear ratio.

As the focus control ring 13 rotates, the photo interrupter 31, as shown in FIG. 2, detects the rotation of the focus control ring 13 by the light receptor of the photo interrupter 31 that counts the gear portion 132 of the focus control ring 13. This information is supplied to the controller to initialize the position of the focus control ring 13.

Figure 7A:
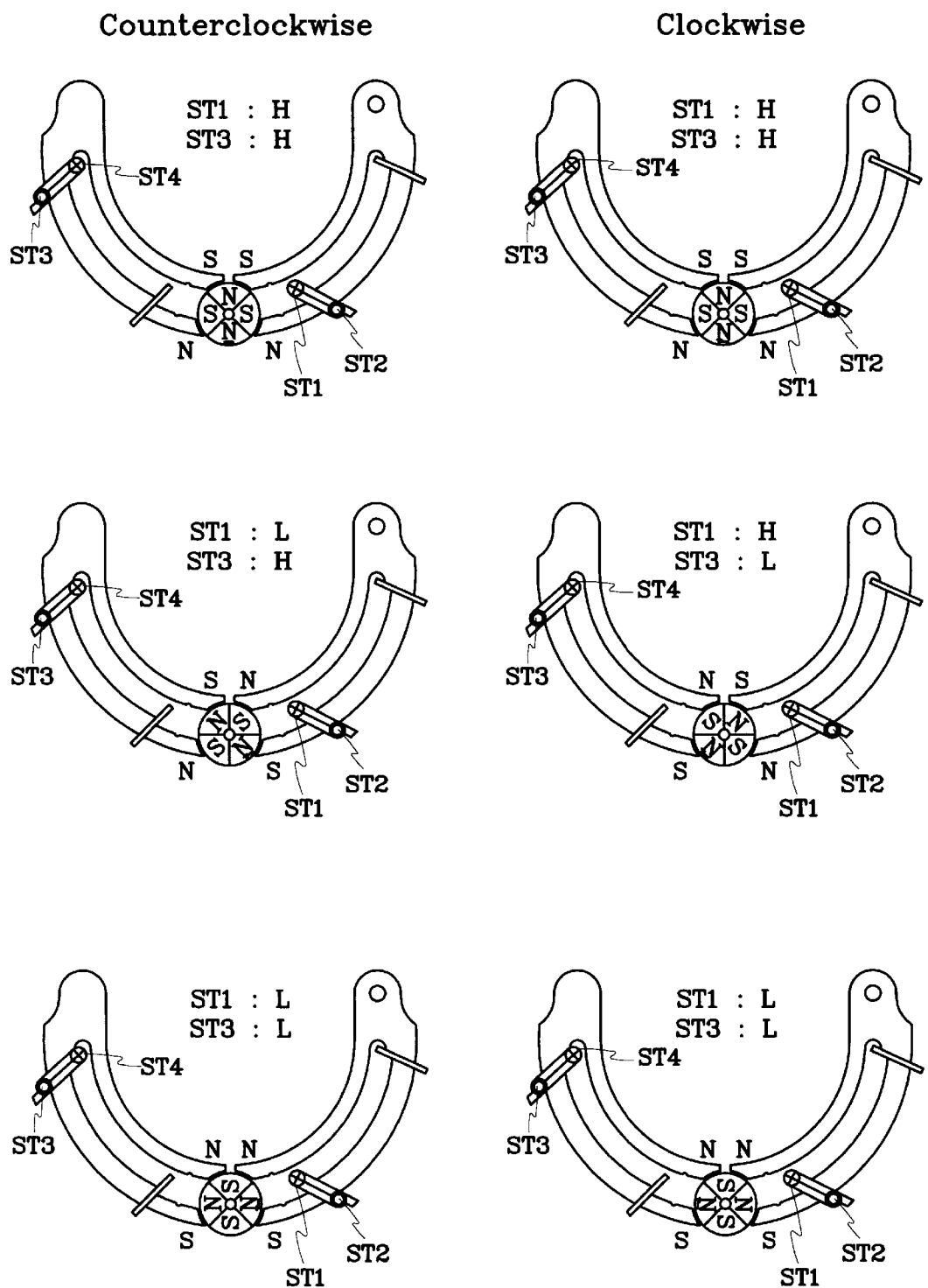
FIGS. 7a and 7b are views illustrating the power source shown in FIG. 1 in a state where power is supplied to the same and different operational states of the power source.
Figure 7B:
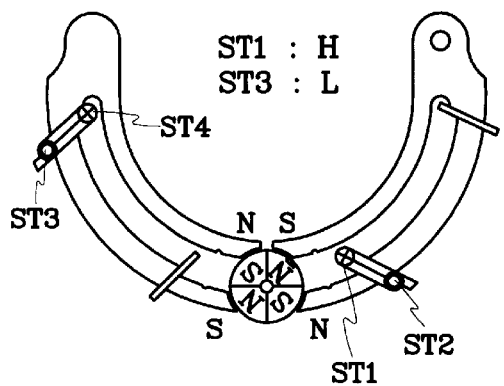
Figure 7B:
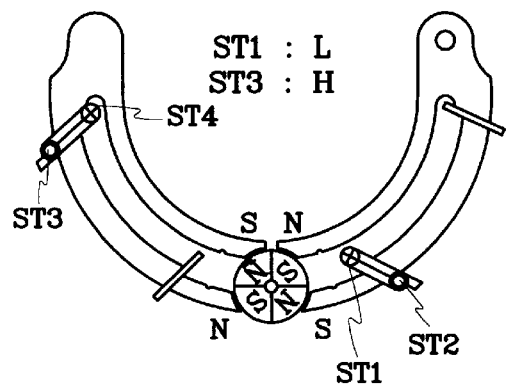
Figure 7B:
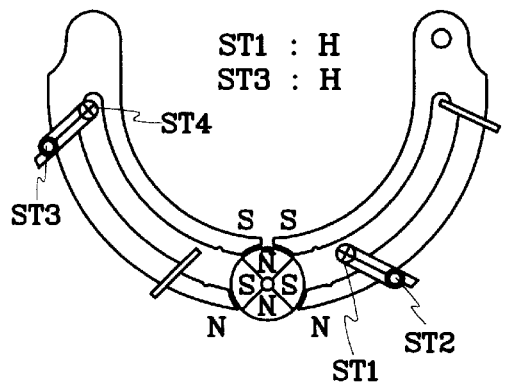
Figure 7B:
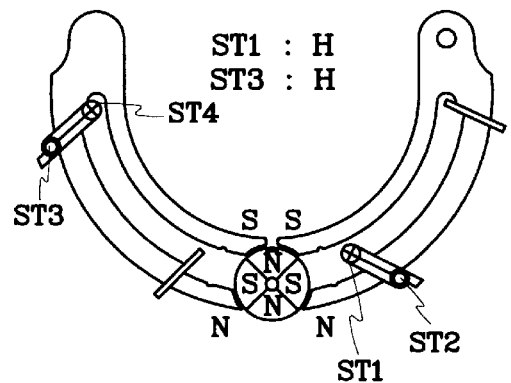
Figure 8:
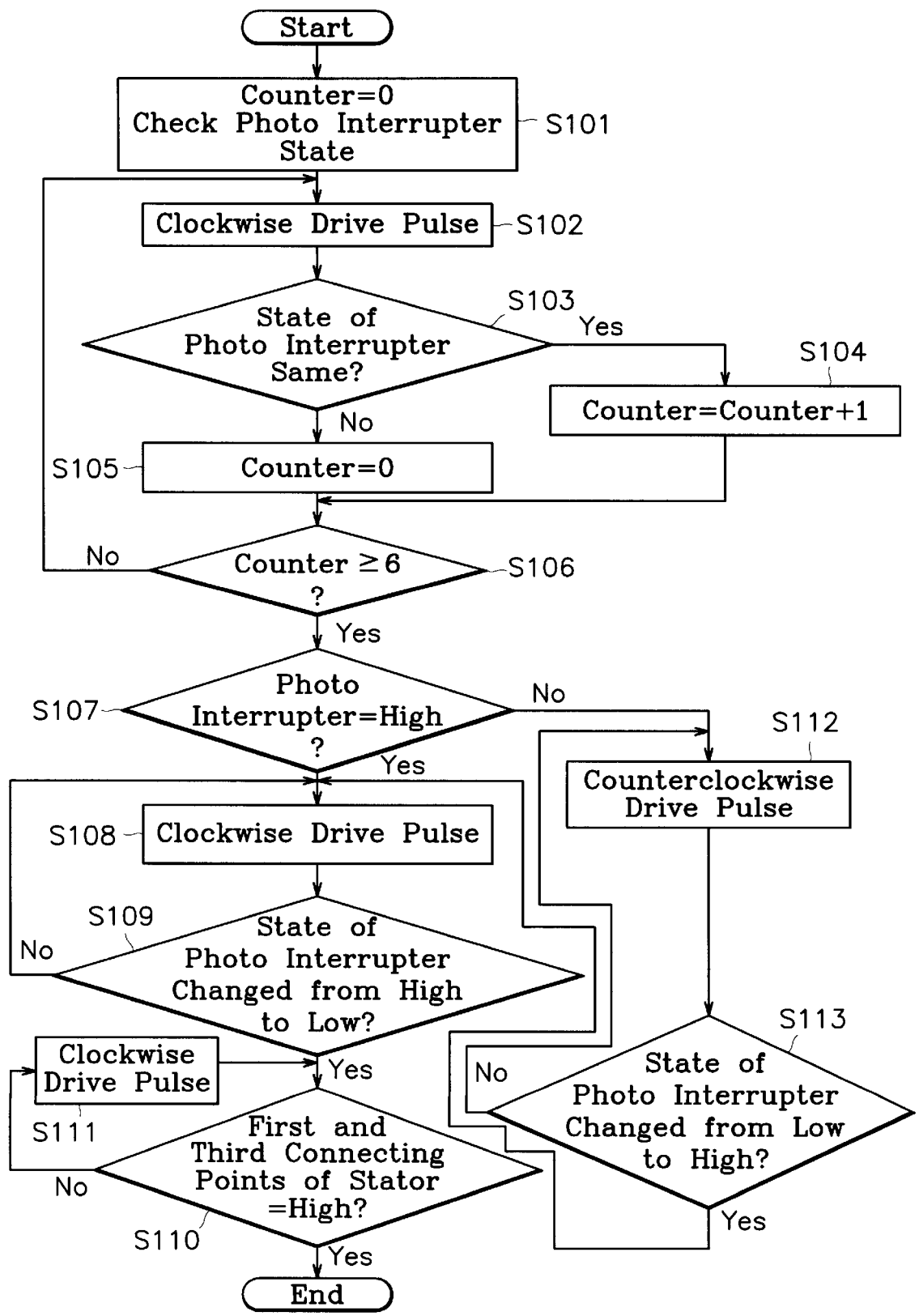
FIG. 8 is a flow chart of a method of detecting an initial position according to a preferred embodiment of the present invention.

The initialization of the focus control ring 13 will be described hereinafter with reference to the flow chart of FIG. 8. Clockwise direction pulse signals and counterclockwise direction pulse signals are illustrated in FIGS. 7A and 7B.

First, in step S101, if the power is turned on or if a first release operation of a shutter switch is detected, the controller (not shown) clears the counter value detected in the photo interrupter 31 to "0", then determines if the present value detected in the photo interrupter 31 is in a high state or a low state. A high state of the photo interrupter 31 indicates that the light is blocked by the gear portion 132 of the focus control ring 13, and a low state indicates that the light receptor is receiving light.

Next, in step S102, the controller applies the predetermined pulse signals to the connecting points ST1, ST2, ST3 and ST4 to rotate the focus control ring 13 clockwise by driving the rotor 2. In step S103, through the signals detected in the photo interrupter 31, the controller determines if the state of the focus control ring 13 remains the same as the state detected in step S101.

In step S104, if the state of the focus control ring 13 is found the same as the state detected in step S101, the counter value is incremented by 1 and if found different, the counter value is cleared to "0" in step S105.

The counter value of the photo interrupter increases as the focus control ring 13 continues to drive, and these counter values continue to be detected. Step S106 checks if the counter value goes beyond a predetermined number (e.g., 6).

In step S106, if the counter value does not surpass the predetermined number, the controller goes back to step S102 and repeats the loop, and if the counter value goes beyond the predetermined number, the controller checks the signal of the photo interrupter 31.

Figure 5:
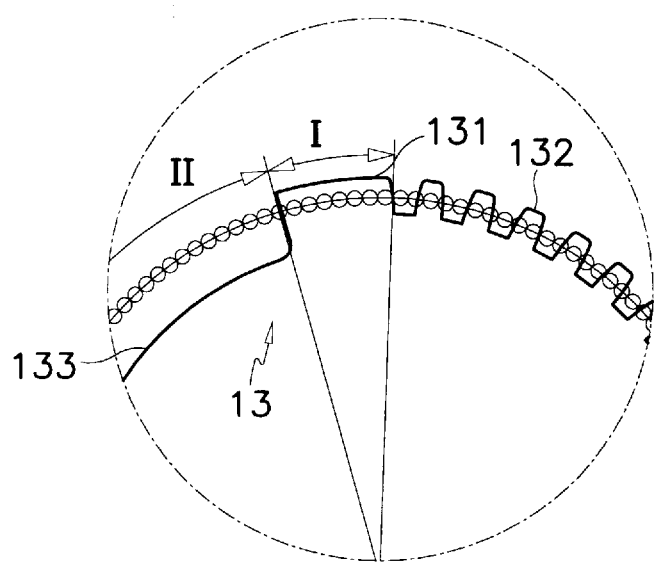
FIG. 5 is a view illustrating an operation of initial position detecting means according to a preferred embodiment of the present invention.

If the signal of the photo interrupter 31 is high, the controller checks if the section extension 131, formed on the outer circumference of the focus control ring 13, corresponds to the position of the photo interrupter 31 (i.e., the photo interrupter 31 is over portion I in FIG. 5). Then clockwise direction pulse signals are applied to the connecting points ST1, ST2, ST3 and ST4 of the stators 5 and the focus control ring 13 rotates clockwise. (Step S108)

In the meantime, the controller checks if the signal of the photo interrupter 31 has changed from high to low. (Step S109)

If the photo interrupter 31 outputs a low signal, the controller determines if high pulse signals are being applied to the first and third connecting points ST1 and ST3. (Step S110)

In the above step S110, if high pulse signals are being applied to the first and third connecting points ST1 and ST3, the controller determines that the focus control ring 13 is at the center (a), as shown in FIG. 10, and completes the initialization of the focus control ring 13. However, if a high signal is not detected, the controller continuously outputs pulse signals to the connecting points ST1, ST2, ST3 and ST4, and applies clockwise drive pulse signals to the first and third connecting points ST1 and ST3 until a high signal is found to be applied.

In step S107, if the photo interrupter 31 outputs a low signal, the controller determines that the section extension 131, formed on the outer circumference of the focus control ring 13, is away from the photo interrupter 31 (i.e., the photo interrupter 31 is over portion II in FIG. 5), and the counterclockwise pulse signals are applied to the connecting points ST1, ST2, ST3 and ST4 to rotate the focus control ring 13 counterclockwise.

Meanwhile, the controller continues to check the signal of the photo interrupter 31 to find if the signal has changed from low to high. (Step S113)

If the photo interrupter 31 outputs a high signal, the controller loops back to step S108 and applies pulse signals in the clockwise direction to the connecting points ST1, ST2, ST3 and ST4 to drive the focus control ring 13 clockwise. This is repeated until the condition of step S109 is met.

In addition, in step S113 above, if it is not determined that the signal of the photo interrupter 31 has changed from low to high, the controller continues to apply counterclockwise pulse signals to connecting points ST1, ST2, ST3 and ST4 as shown in FIGS. 7A and 7B.

When a high pulse signal is applied to the first and third connecting points ST1 and ST3, indicating that the focus control ring 13 is at the center (a), the controller moves the focus control lens clockwise or counterclockwise through the focus adjustment while keeping the diaphragm completely open to compensate for focus control errors generated during the lens assembly process.

Figure 9:
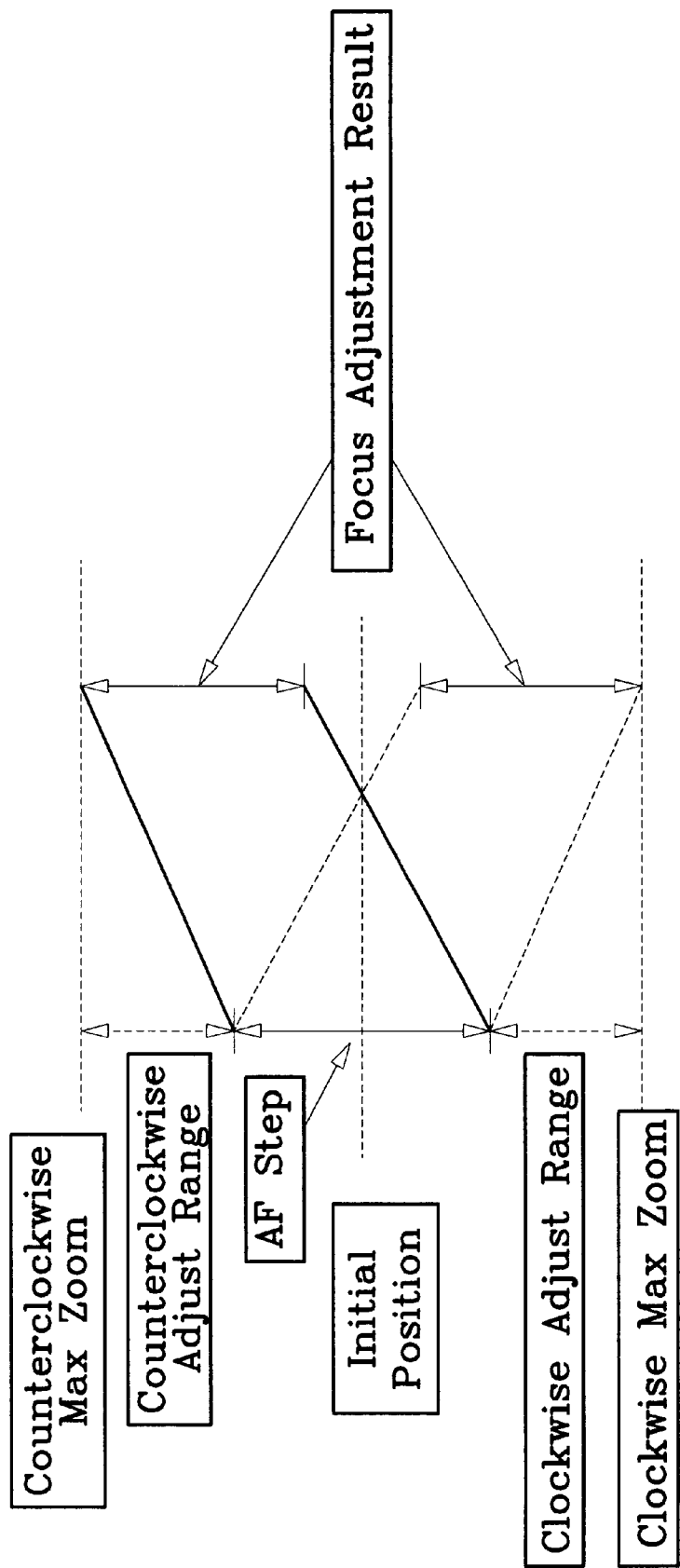
FIG. 9 is a drawing used for describing electronic focus adjustment according to a preferred embodiment of the present invention.

The controller, as shown in FIG. 9, continuously moves the focus control lens according to signals applied from the focus checking unit. The controller checks the number of focus adjustment steps required for the assembly error compensation, i.e. the number of steps corresponding to a difference in the present location to the initial position, and stores the data in the memory.

A zoom camera repeats these steps as the lens barrel moves along a subsequent focal distance, and stores compensation data for each focal distance.

After establishing the initial position and compensating for focal errors generated in the lens assembly process, the controller detects a release signal from a shutter release button (not shown). If a release signal is detected, the controller rotates the focus control ring 13 according to the distance to the subject measured by the distance meter to perform automatic focus control.

Then, the controller, as shown in FIGS. 7A and 7B, applies clockwise and counterclockwise pulse signals to the connecting points ST1, ST2, ST3 and ST4 to drive the focus control ring 13 clockwise and counterclockwise through the rotor 2 of the power source 1. As a result, the focus control lens, with reference to FIG. 10, is moved from the initial position (a) to a minimum zoom position (b) or a maximum zoom location (c) to control the focus according to the distance to the subject, and to control exposure.

Here, the focus control lens, with reference to FIG. 3, is integrally joined to the lens holder 15. As the lens holder 15 is prevented from rotating by the grooves 21 formed along the inner circumference of the motor cover 20, the focus control lens moves straight when the focus control ring 13 rotates. If the transfer gear, meshed with the motor gear 3 of the power source 1, rotates the focus control ring 13 clockwise, the focus control lens moves toward the sector, whereas if the focus control ring 13 is rotated counterclockwise, the focus control lens moves toward the subject.

Here, if two pulse signals, corresponding to one step, are applied to the connecting points ST1, ST2, ST3 and ST4, the rotor 2 rotates 90° such that the focus control ring 13 rotates one step by the one-step drive of the rotor 2. Electromagnetic balance is maintained by the rotor 2 such that it always rotates 90 degrees at a time, which eliminates the necessity of a locking device for the focus control ring 13.

After focus control is complete, the power source 1 is required to be stabilized in order to prevent it from overrunning.

Figure 11:
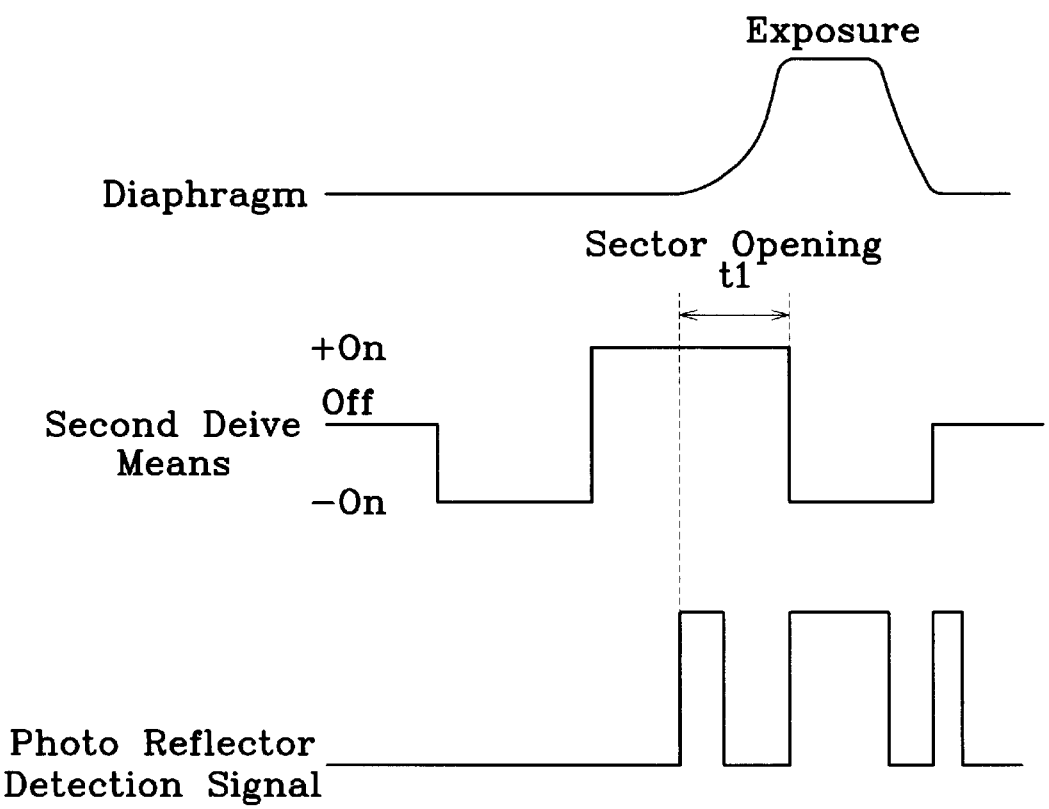
FIG. 11 is a timing chart used to describe the sector operation according to a release operation in a preferred embodiment of the present invention.
Figure 12:
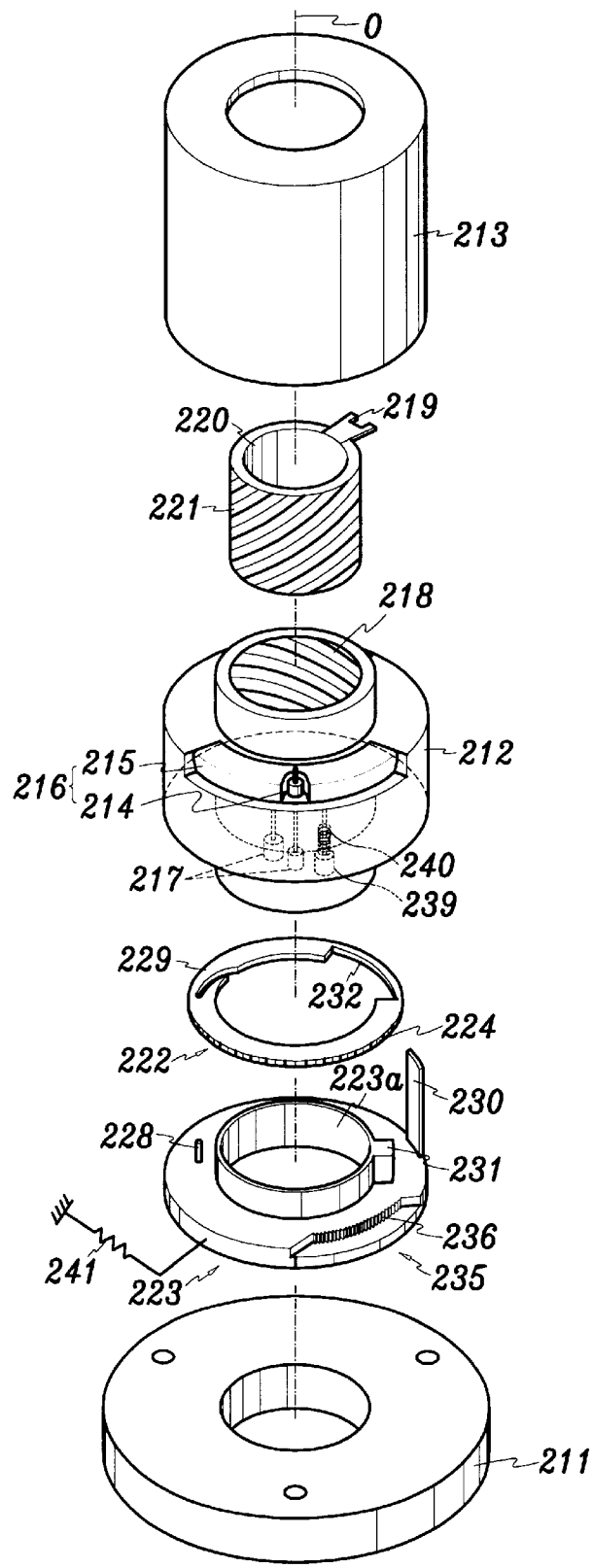
FIGS. 12–18 are views used to describe drive operations of conventional electronic shutters used in cameras.
Figure 13A:
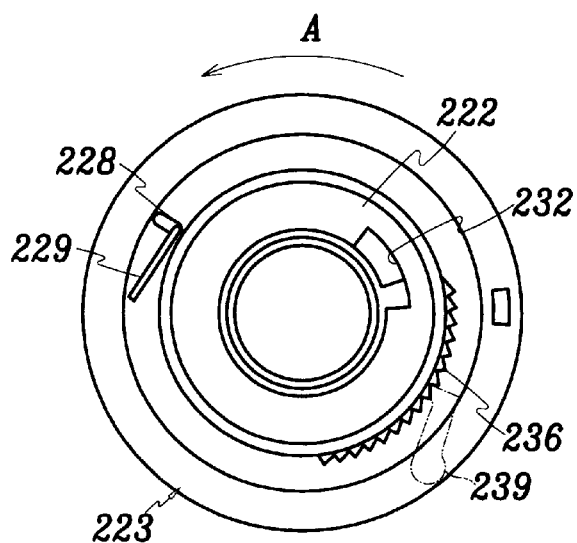
Figure 13B:
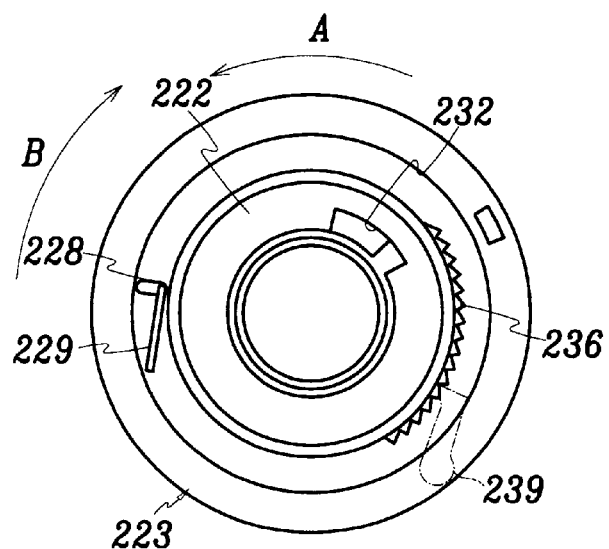
Figure 13C:
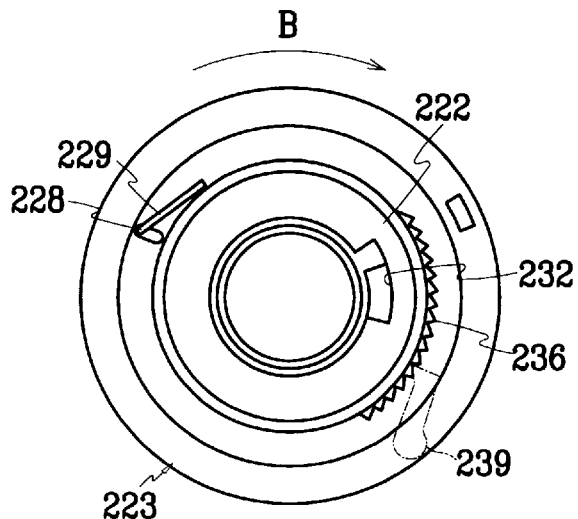
Figure 14:
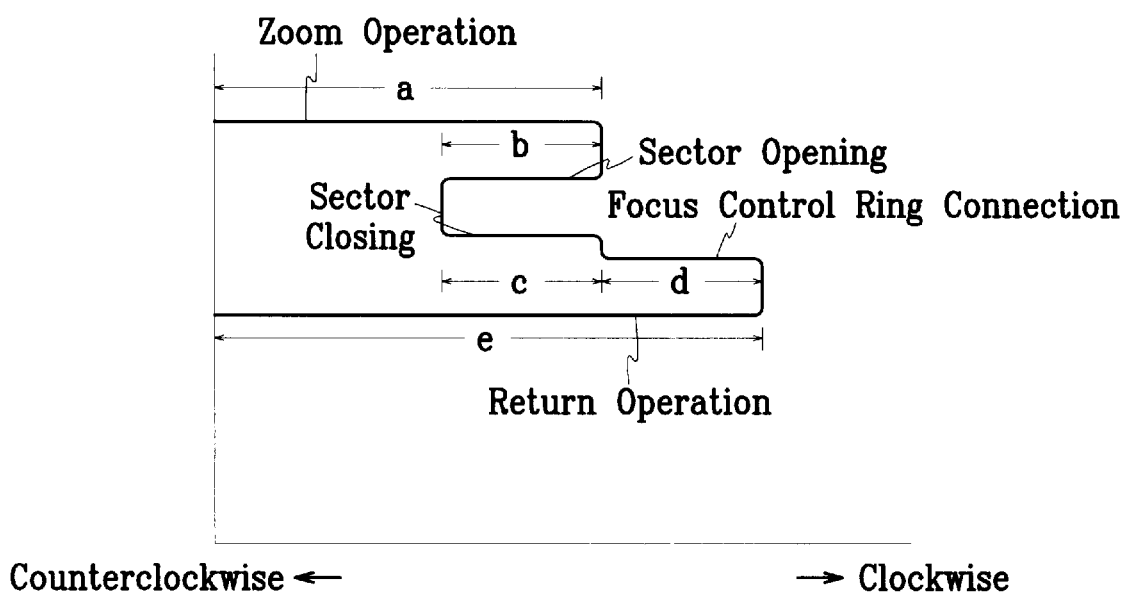
Figure 15:
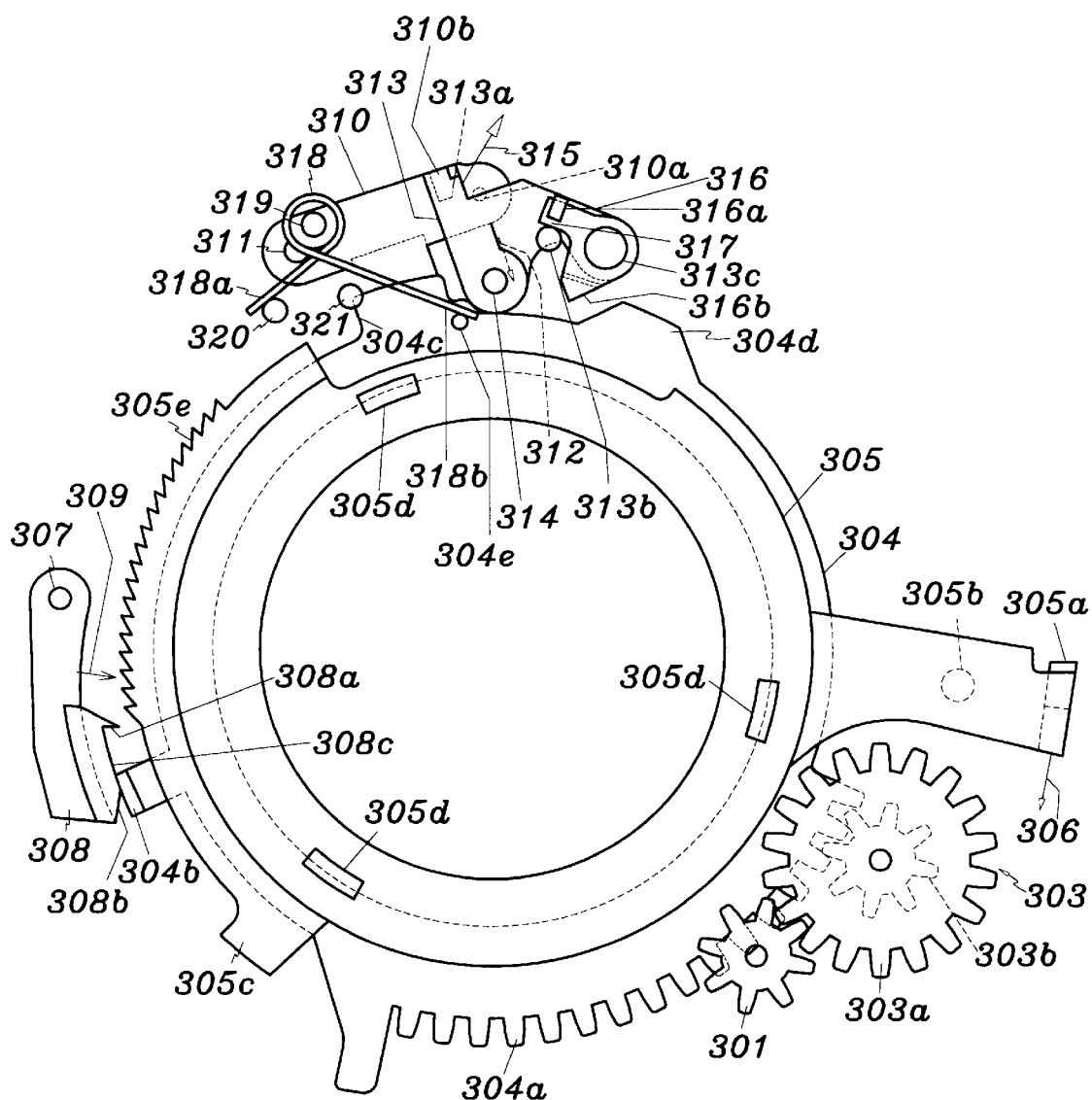
Figure 16:
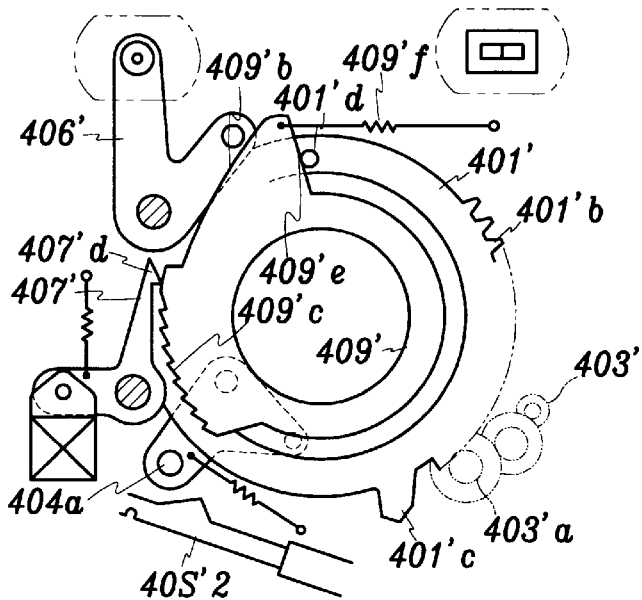
Figure 18:
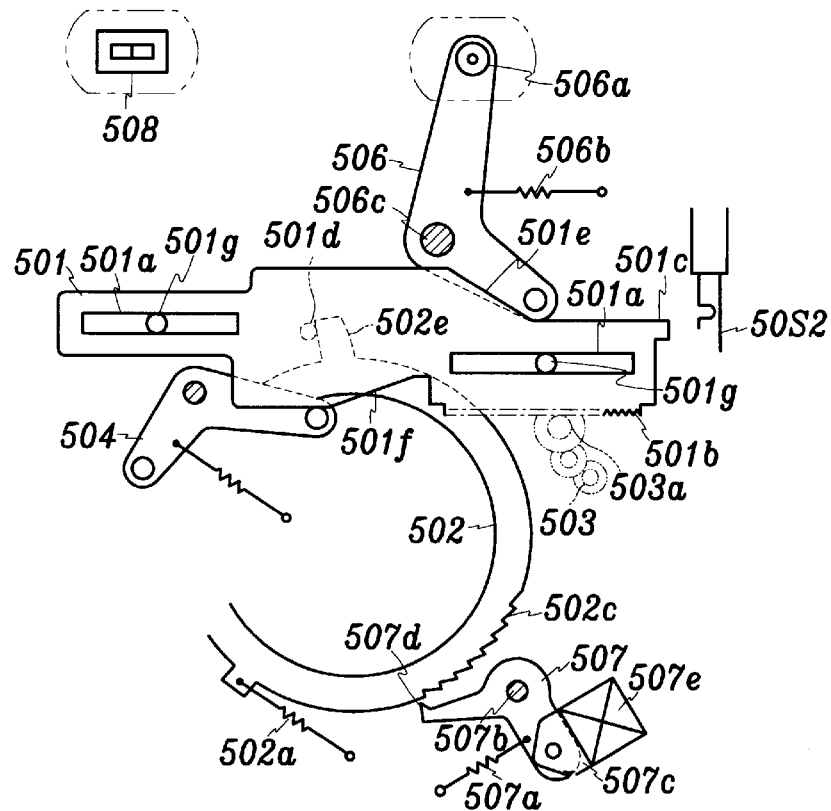
Figure 17:
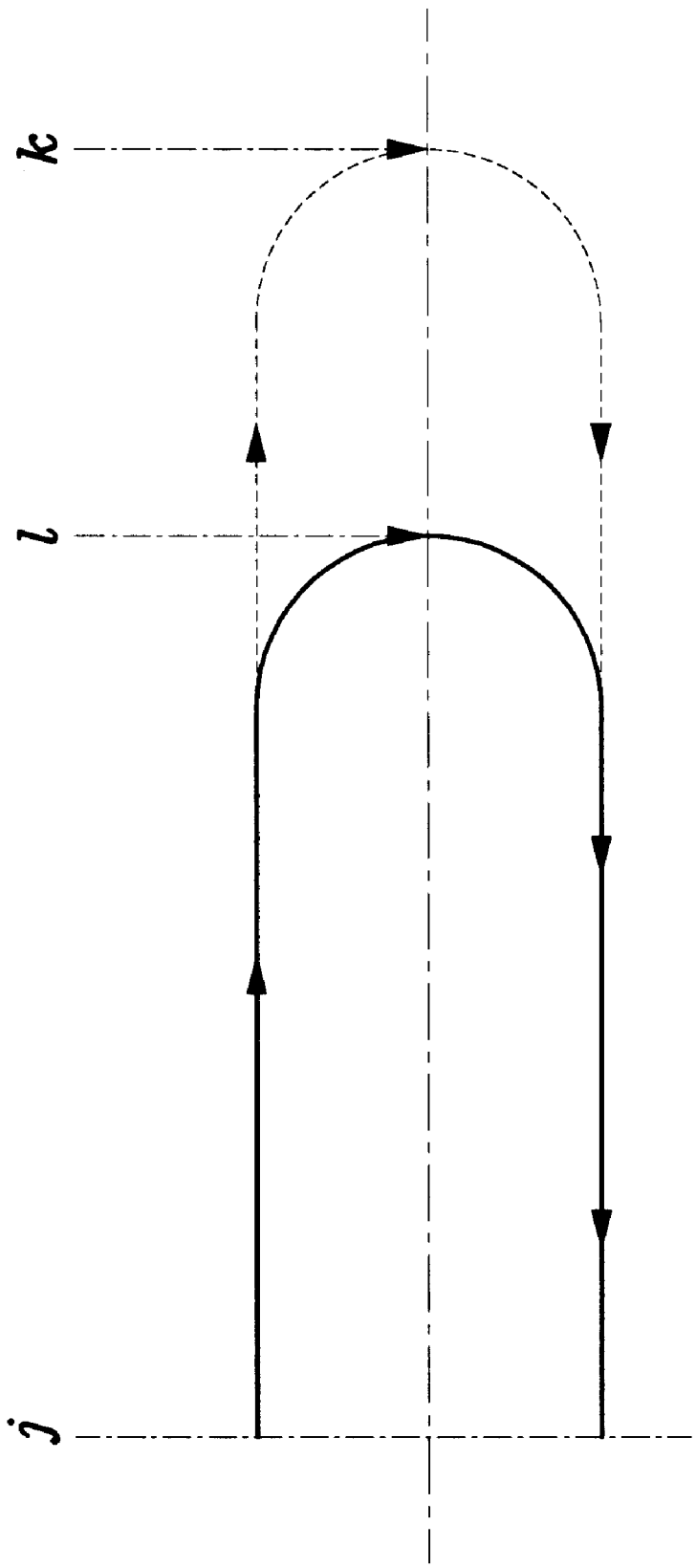

After the focus control, the controller drives the automatic exposure meter 41, which is the second drive unit. Here, as shown in FIG. 11, the controller supplies current in the clockwise direction to the automatic exposure meter 41 for a predetermined period "t1". Accordingly, the automatic exposure meter 41 rotates clockwise by the elastic force of the elastic member 49 such that the gear lever 51 and the sector pin 53 shown in FIG. 2 move downward (in the drawing), thereby fully opening the sectors 57 and 59 as shown by the dotted lines 57' and 59' of FIG. 4. Since the elastic force of the elastic member 49 opens the sectors 57 and 59, it keeps the sectors 57 and 59 open stable because the automatic exposure meter 41 does not get a drive resistance.

In order to control the opening of the sectors 57 and 59 (i.e., to precisely control exposure), the controller detects the point at which exposure starts by detecting the position changes of tab 61 through the photo reflector 63. As shown in FIG. 11, the photo reflector 63 detects pulse signals corresponding to the tab 61 of the sector 57 and the first high pulse signal indicates the starting point of exposure.

After predetermined period of delay time t1, the controller applies current counterclockwise to the automatic exposure meter 41 to rotate it counterclockwise. Accordingly, the boss 43 of the automatic exposure meter 41 moves the stopper 47 of the gear lever 45 counterclockwise. As a result, the sector lever 51, meshed with the gear lever 45, rotates clockwise (see FIG. 2), thereby closing the sectors 57 and 59.

In the drive method and device for an electronic shutter used in cameras described above, when the power is turned on or the shutter operation is detected, as the focus control lens position is initialized. Therefore, focus control time is minimized by reducing the movement of the focus control lens.

After automatic focus control is complete, since the elastic force of the elastic member opens the sectors, the present invention does not cause resistance or vibration of the power source that can be found in the conventional camera, which provides more stability and reliability in picture-taking.

Finally, the compensation mechanism for assembly errors through database collected during actual shootings realizes more exact focus control.

Figure 19:
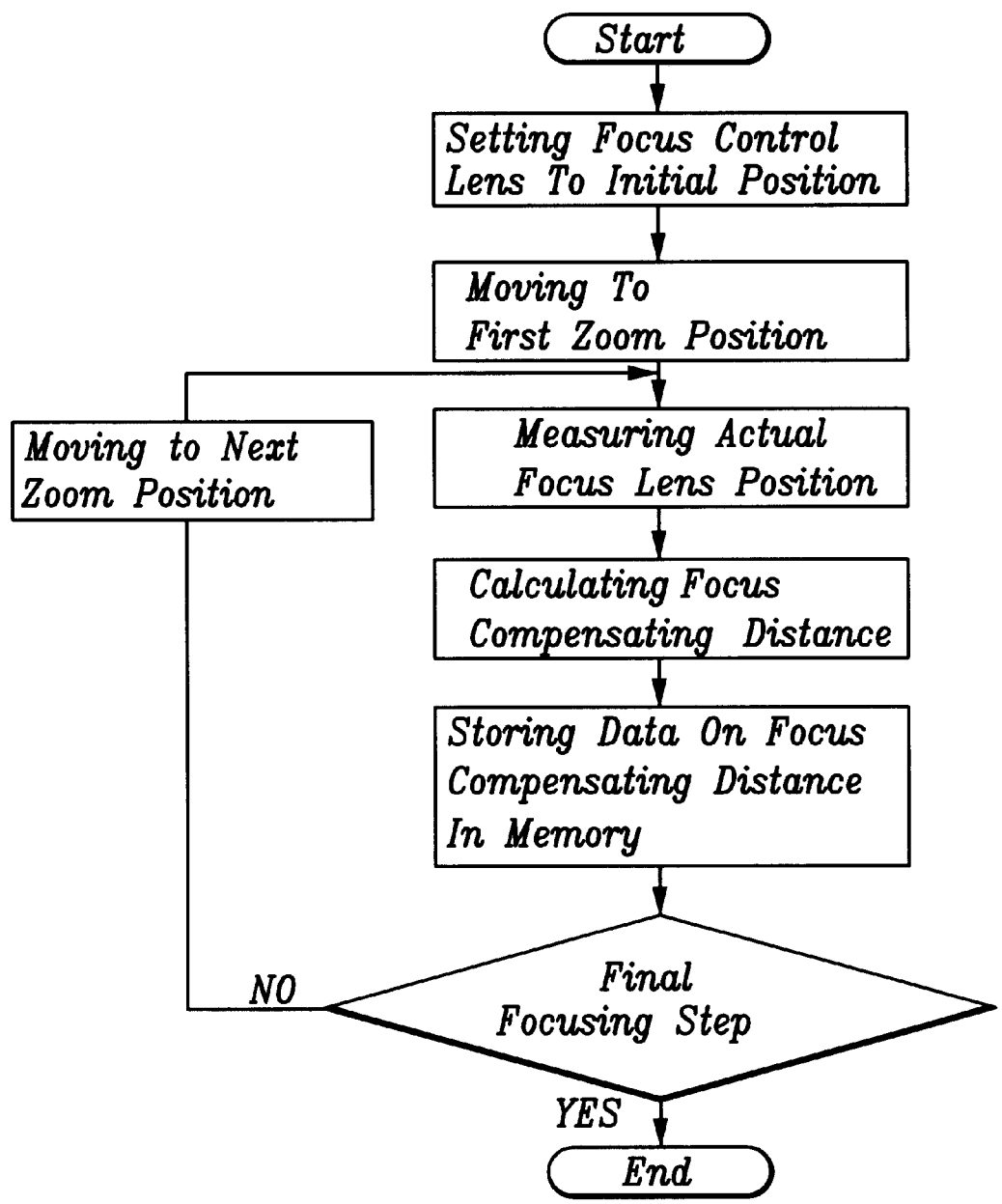
FIG. 19 is a flow chart of a method of measuring focus compensating data which is used when driving a shutter according to a preferred embodiment of the present invention.

Describing a method for measuring focus compensating data with reference to FIG. 19, after setting the focus control ring to the initial position, a lens barrel is moved to a first zoom position to a subject. However, due to inherent assembly or mechanical imperfections of the camera, an actual focus lens position, where the focus control lens should be located, does not result in exactly equaling the first zoom position. Therefore, the actual focus lens position is measured to calculate a focus compensating distance from a designed focus lens position to the actual focus lens position. The calculated focus compensating distance is stored in a recording medium. Then, it is determined if the first zoom position is a final zoom position. If it is not the final zoom position, the lens barrel is moved to a next zoom position. At this time, an actual focus lens position of the next zoom position is also measured to calculate a focus compensating distance from the next zoom position to the actual focus lens position. This is repeated until the next zoom position becomes the final zoom position. The focus compensating distance attained through this method is used when controlling the shutter drive of the camera.

Figure 20:
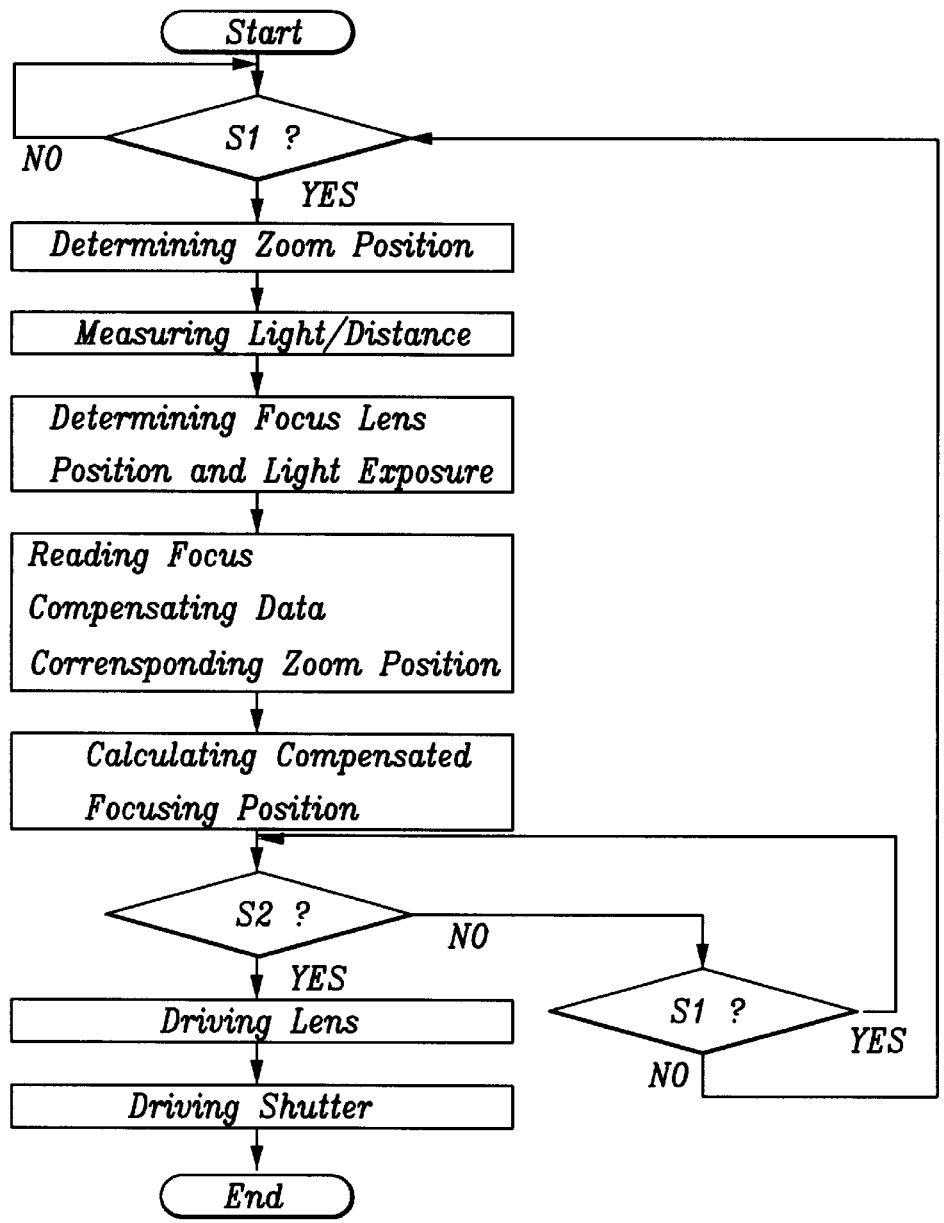
FIG. 20 is a flow chart of a method of driving a shutter according to a preferred embodiment of the present invention.

FIG. 20 shows a flow chart illustrating a method of driving a shutter of a camera according to the present invention, the shutter drive being performed on the basis of the focus compensating data.

When the camera is turned on, it is determined whether a first shutter release is performed. If the first shutter release is performed, the zoom position and the light and the distance to the subject are measured to determine a focus position of the lens to the subject and a light exposure. After reading the focus compensating data from the memory, the compensated focus position is calculated. It is then determined whether a second shutter release is performed, and, if so, the focus lens is moved to the compensated focus position to the subject and the shutter is driven.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for driving a shutter of a camera in which focus compensation data are stored in a memory, the focus compensation data being a difference between a designed focus lens position and an actual focus lens position, comprising the steps of:

determining whether a first shutter release is performed;

determining a zoom position;

measuring light and distance to the subject if the first shutter release is performed;

determining both a focus position of the focus control lens to the subject and a light exposure according to the measured light and distance;

reading the focus compensation data corresponding to the determined zoom position, from the memory;

calculating a compensated focus position on the basis of the focus compensation data;

determining whether a second shutter release is performed;

moving the focus control lens to the compensated focus position, wherein an initial position of the focus control lens is the middle position among all focus control steps from a focus position for the farthest distance to a subject to a focus position for the closest distance to the subject; and driving the shutter.

2. The method of claim 1, wherein the focus compensation data are obtained by a method comprising the steps of:

(a) setting a focus control lens to an initial position;

(b) moving a lens barrel to a first zoom position to a subject;

(c) measuring an actual focus lens position;

(d) calculating a focus compensating distance by measuring the difference between a designed focus lens position and an actual focus lens position;

(e) storing data on the calculated compensating distance in the memory;

(f) determining if the first zoom position is a final zoom position;

(g) moving the lens barrel to a next zoom position to a subject, if the lens barrel is not at the final zoom position; and (h) repeating steps (b) through (g) until the lens barrel locates at the final zoom position.

* * * * *